(12) United States Patent
Musil et al.

(10) Patent No.: US 6,247,878 B1
(45) Date of Patent: Jun. 19, 2001

(54) DEVICE AND METHOD FOR ADJUSTING THE POSITION OF CUTTING INSERTS MOUNTED IN A CUTTING TOOL

(75) Inventors: John C. Musil, Mantua; Bret A. Robison, Madison, both of OH (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/415,662

(22) Filed: Oct. 12, 1999

(51) Int. Cl.[7] ........................................ B23B 29/02
(52) U.S. Cl. .................. 408/1 R; 408/156; 408/162; 408/713
(58) Field of Search .............................. 33/633, 634, 635, 33/636, 637; 408/1 R, 154, 155, 156, 157, 159, 162, 165, 166, 180, 713; 407/37, 45

(56) References Cited

U.S. PATENT DOCUMENTS

| 3,381,553 | 5/1968 | Lutz ............................................ 77/58 |
| 3,410,160 | 11/1968 | Barre .......................................... 77/58 |
| 3,492,709 | 2/1970 | Barre .......................................... 29/96 |
| 3,530,745 | 9/1970 | Milewski ................................... 77/58 |
| 4,428,704 | * 1/1984 | Kalokhe ................................. 408/156 |
| 4,606,680 | * 8/1986 | Striegl ................................... 408/156 |
| 5,704,742 | * 1/1998 | Reinauer ............................... 408/156 |

FOREIGN PATENT DOCUMENTS

4447558A1    12/1996    (DE).

* cited by examiner

Primary Examiner—Daniel W. Howell
(74) Attorney, Agent, or Firm—Larry R. Meenan

(57) ABSTRACT

A mechanism and method for adjusting the position of a cutting insert relative to the body of a cutting tool is disclosed. The mechanism of the invention comprises a pair of flexible cantilevered walls each defining a wall of cutting insert pocket in the body of a boring bar. A boring bar of the invention comprises a bar body having at least one pocket for receiving a cutting insert and a position-adjusting mechanism including a pair of flexible cantilevered walls each defining a wall of the pocket. In the method of the invention, a boring bar is provided having a plurality of pockets each defined by a pair of cantilevered walls adapted to be flexed by a wedge mechanism. Next, a cutting insert is installed into each pocket. The position of the cutting edge of each cutting insert is then determined. In the last step of the method, the radially inwardmost insert is adjusted outward by using the wedge mechanism to flex the cantilevered walls.

15 Claims, 4 Drawing Sheets

DEVICE AND METHOD FOR ADJUSTING THE POSITION OF CUTTING INSERTS MOUNTED IN A CUTTING TOOL

FIELD OF THE INVENTION

This invention generally relates to adjusting devices for cutting tools and is specifically concerned with a device for adjusting the position of the cutting edge of an insert mounted on the body of a boring bar.

BACKGROUND OF THE INVENTION

Devices for adjusting the position of cutting inserts in boring bars and other tools are known in the prior art. However, before such adjusting devices are described, a brief description of the mechanical context of such devices will be given.

Boring bars have a generally cylindrical bar body. A plurality of cutting inserts are mounted around the periphery of the body of the boring bar in recesses known as "pockets" that conform to the shape of two of the sides of the inserts. Each insert is secured into its respective pocket by means of a clamping screw which extends through a centrally-located hole in the insert. While pockets and clamping screws provide a secure mount for the inserts during a cutting operation, they do not, unfortunately, provide a system operator with any means for making fine adjustments in the position of the cutting edges of the inserts mounted around the periphery of the boring bar. This is unfortunate, since even small misalignments between the edges of the cutting inserts on the order of 0.001 inch can result in uneven wear of the inserts and a decrease in the performance of the boring bar. Even if the pockets were perfectly machined to the desired dimension, the inserts themselves can easily vary in size 0.001 of an inch or more due to manufacturing tolerances or uneven wear during use.

To solve this problem, devices for making small adjustments in the position of the cutting inserts in such tools were developed in the prior art. In one of the most common designs, one of the walls of the insert-receiving pockets in the tool body is replaced with a rectangular-shaped member known as a "cartridge" that is slideably mounted onto the body of the boring bar or other tool by means of a bolt. The cartridge is adjusted by one or more adjustment screws that are turned in order to slide the cartridge in a direction which can move the cutting edge of the insert either axially or radially with respect to the cutting edges of the other inserts mounted around the body of the boring bar.

While such prior art devices are capable of aligning the cutting edges of the inserts, the applicants have observed a number of shortcomings associated with such devices. For example, the metal-to-metal contact between the cartridges and the body of the boring bar often creates, on a microscopic level, an irregular sticking friction which results in irregular movement of the sliding wedge element as the adjustment screw is turned. Such friction coupled with the fact that even a partial turn of the adjusting screw moves the cartridge a relatively large distance on a microscopic level often causes the system operator to overshoot his intended positioning goal (which may be as small as 0.0005 inches). Overshooting of the positioning goal, in turn, requires the system operator to start over, thus creating an undesirable amount of unproductive downtime for the boring bar or other tool. Another shortcoming of such a design is that it requires the manufacture and assembly of additional precision parts onto the body of the boring bar. This of course results in higher manufacturing costs. Finally, it is possible for the adjustment screws used in such devices to loosen slightly from the vibrations associated with the machining operation, thus causing the cutting edge of the insert to shift out of position.

Clearly, there is a need for a mechanism for making fine adjustments to the position of cutting inserts mounted around a boring bar or other tool in order to eliminate undesirable marks in the workpiece which is easier and faster to use than prior art adjusting devices. Ideally, such an adjusting mechanism would require the manufacture and assembly of fewer precision parts so as to minimize the cost of the resulting adjustable boring bar or other tool, and would resist becoming loosened from the shock and vibration caused by the machining operation. Finally, it would be desirable if such an adjusting mechanism could be easily installed onto existing boring bars and other types of cutting tools.

SUMMARY OF THE INVENTION

Generally speaking, the invention is directed to a mechanism and method for adjusting the position of a cutting insert relative to the body of a cutting tool that overcomes all of the aforementioned shortcomings associated with the prior art. To this end, the mechanism of the invention comprises a pair of flexible cantilevered walls each defining a wall of a cutting insert pocket in the body of a boring bar.

A boring bar of the invention comprises a bar body having at least one pocket for receiving a cutting insert and a position-adjusting mechanism including a pair of flexible cantilevered walls each defining a wall of the pocket.

In the method of the invention, a boring bar is provided having a plurality of pockets each defined by a pair of cantilevered walls adapted to be flexed by a wedge mechanism. Next, a cutting insert is installed into each pocket. The position of the cutting edge of each cutting insert is then determined. In the last step of the method, the radially inwardmost insert is adjusted outward by using the wedge mechanism to flex the cantilevered walls.

Advantageously, the slight flexing of the cantilevered walls provides an adjustment device which is easily and highly controllable for fine position adjustments. The reactive force that the cantilevered walls applies to the wedge mechanism eliminates backlash and assists in locking the wedge mechanism in position so that it will not loosen as a result of the shock and vibration associated with a machining operation. The method of the invention advantageously provides an easy technique for installing and using the position adjusting device on a conventional boring tool having a bar body with an insert-receiving pocket.

DETAILED DESCRIPTION OF THE INVENTION

Figure 1:
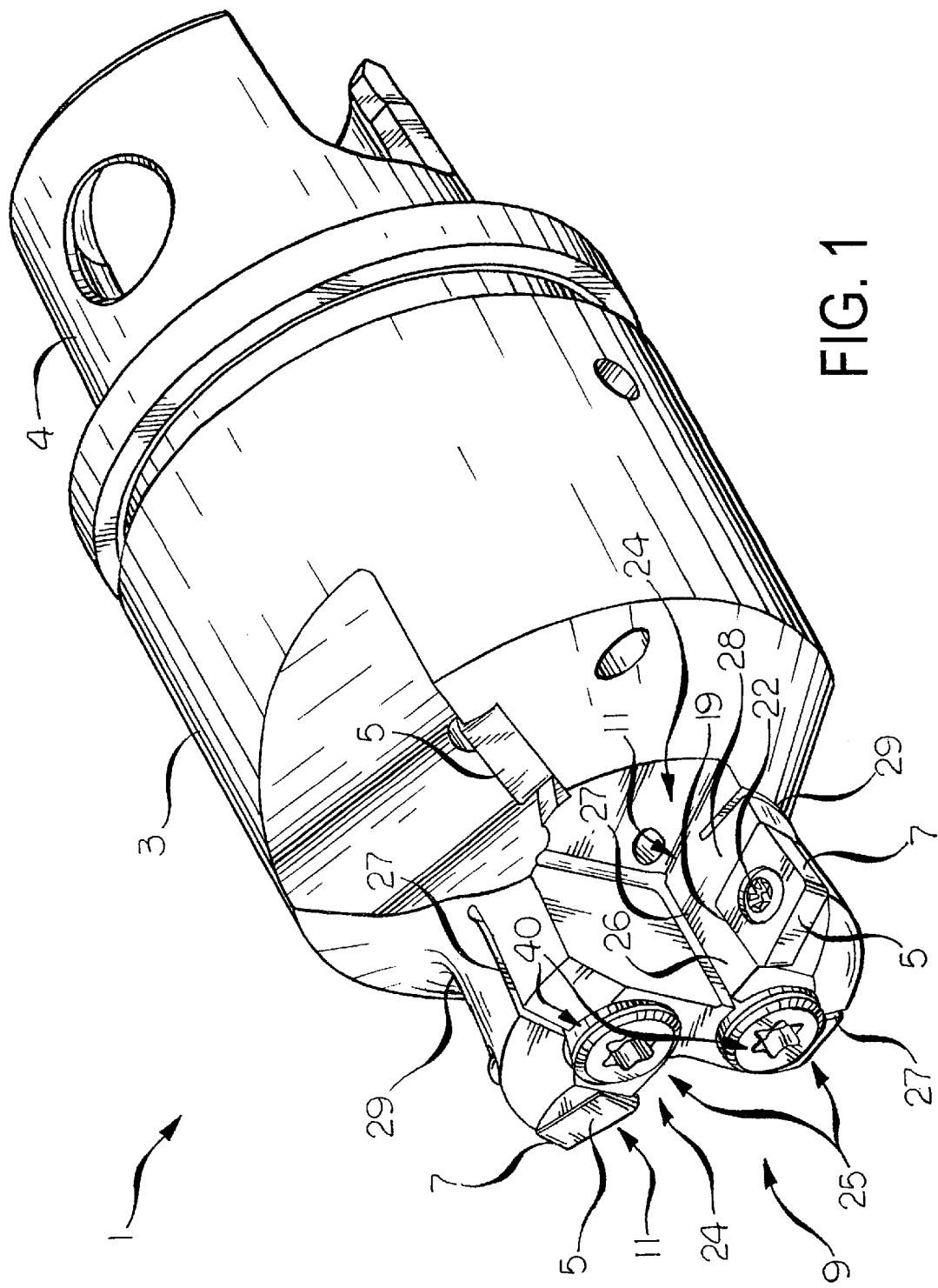
FIG. 1 is a perspective view of a boring bar that includes the insert-adjusting device of the invention.
Figure 2:
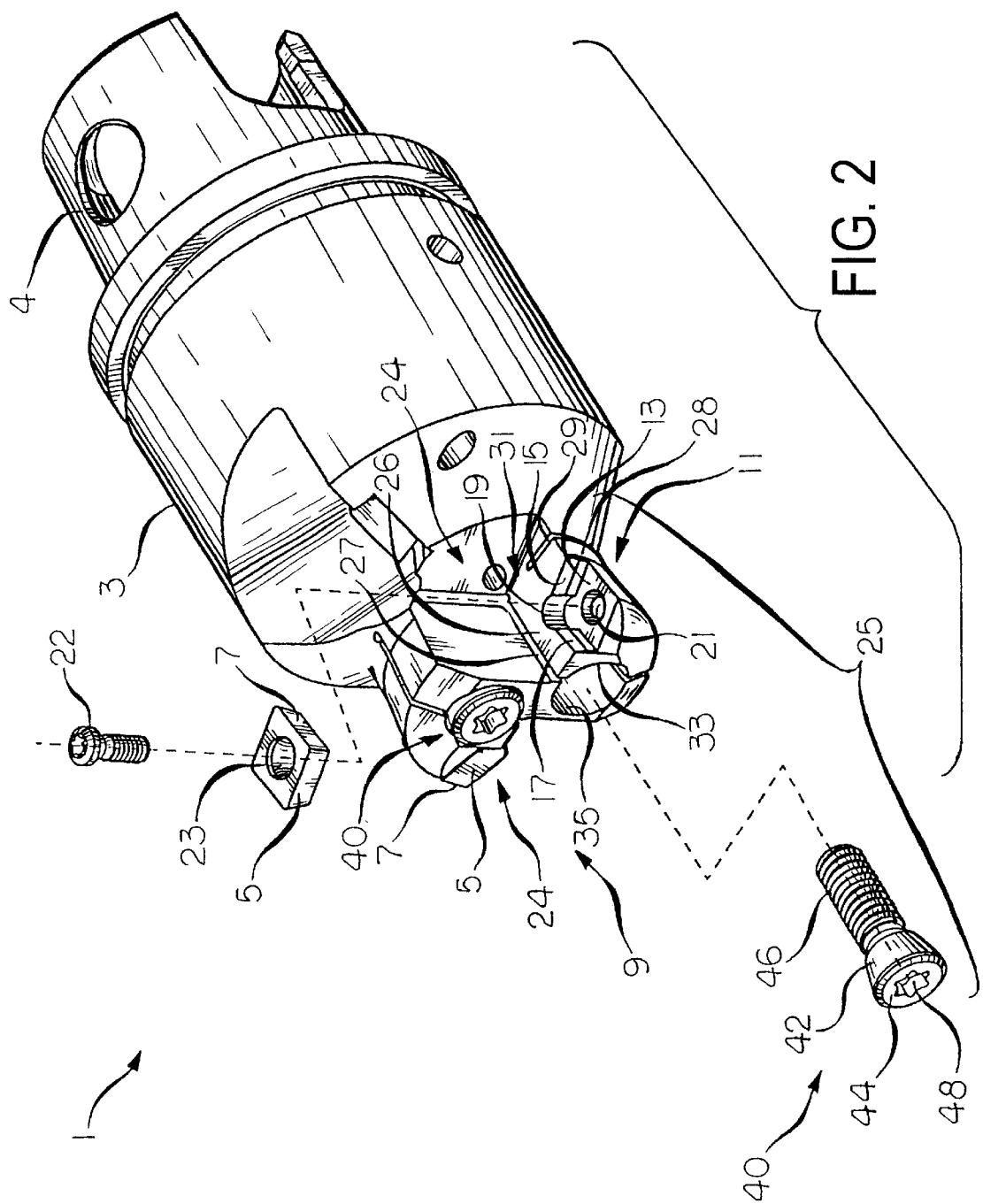
FIG. 2 is a reduced-scale, front, exploded, perspective view of the boring bar illustrated in FIG. 1.

With reference now to FIGS. 1 and 2, wherein like numerals designate like components throughout all of the several Figures, the position-adjustment mechanism of the invention is adapted for use on a boring bar 1 having a bar body 3 with a shank 4 for receiving a clamping unit adapter for a rotating spindle (not shown). A plurality of cutting inserts 5 with cutting edges 7 are uniformly secured to the front end 9 of the bar body 3 by means of mounting assemblies 11. Each mounting assembly 11 includes a pocket 13 having a radial support surface 15 and an axial support surface 17 for receiving and supporting a cutting insert 5. A corner relief recess 19 is provided between the radial and axial support surfaces 15, 17 for receiving the corner of the insert 5 held within the pocket 13. The mounting assembly 11 further includes a threaded bore 21 that extends from the bottom of the pocket 13 into the bar body 3 for receiving the threaded shank of a clamping screw 22 insertable through a centrally disposed hole 23 in the insert 5. Chip flutes 24 are provided at the periphery of the insert-receiving pocket 13 to provide space for the expulsion of metal chips and liquid coolant during a machining operation.

Figure 3A:
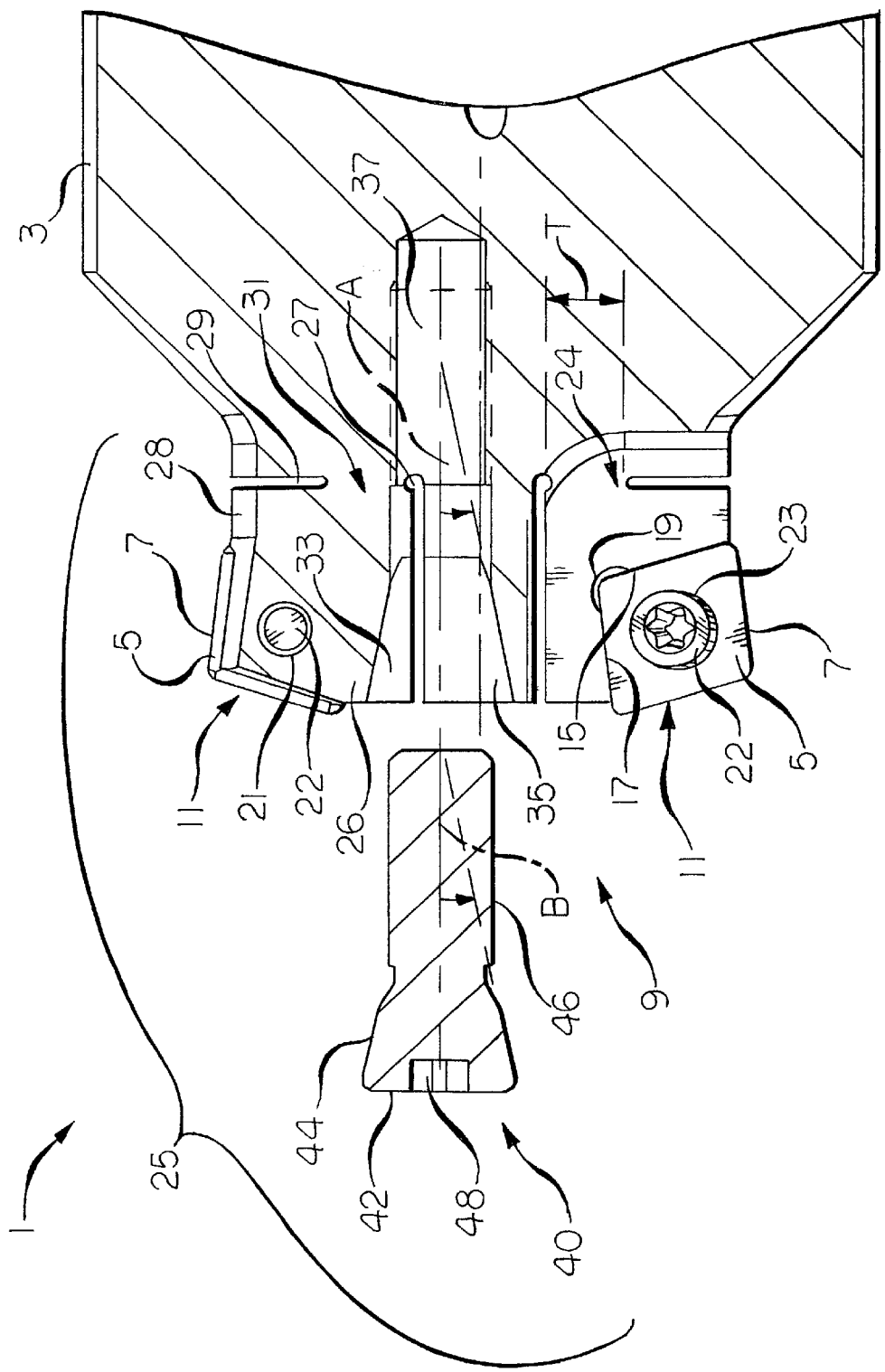
FIGS. 3A and 3B are enlarged, partial, cross-sectional views of the boring bar illustrated in FIG. 1 showing the wedge device of the invention in exploded and assembled forms, respectively.
Figure 3B:
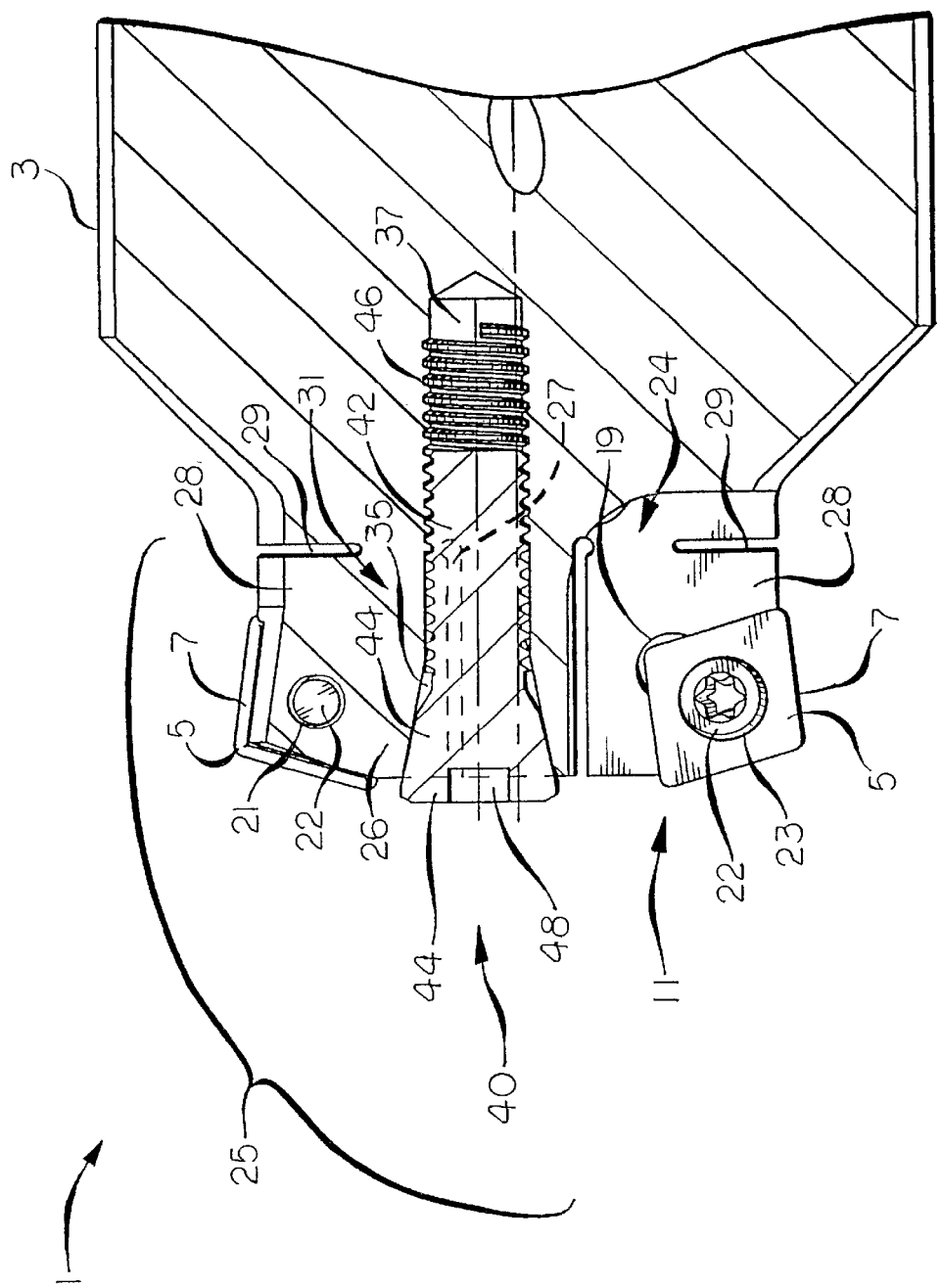

The position-adjusting mechanism 25 includes a pair of cantilevered walls or ribs 26, 28 which, as best seen in FIGS. 3A and 3B, are integrally connected to the bar body 3. In the preferred embodiment, an axial cantilevered wall 26 defines the axial wall of the insert-receiving pocket 13. This wall 26 is defined by an axial relief slot 27 and, in this particular embodiment, the axial support surface 17 of the insert-receiving pocket 13. A radial cantilevered wall 28 defines the radial wall of the insert-receiving pocket 13. This wall 28 is defined by a radial relief slot 29 and the radial support surface 15 of the insert-receiving pocket 13. The axial relief slot 27 is separated from the radial relief slot 29 by a portion of the bar body 3 that defines a pivot point 31 for the insert-receiving pocket 13, as best seen in FIG. 2. The thickness T (shown in FIG. 3A) of the axial cantilevered wall 26 is sufficiently small to allow a wedge mechanism to flex it a few thousandths of an inch radially. When the bar body 3 is formed from a high carbon chromium-vanadium alloy steel (such a ANSI 6150), the thickness T should be about 0.125 inches. Since the cantilevered walls 26, 28 are formed by the cutting of relief slots 27, 29 in the bar body 3, the cantilevered walls 26, 28 are integrally connected to the bar body 3, as shown in FIGS. 3A and 3B.

With reference to FIGS. 3A and 3B, an arcuate recess 33 is provided in a portion of the axial cantilevered wall 26. Another arcuate recess 35 is provided in an opposing surface of the axial relief slot 27. These two recesses 33, 35 define a single, frusto-conical conical recess that leads into a threaded bore 37 for receiving the wedge mechanism 40 of the position-adjusting mechanism 25. In the preferred embodiment, the wedge mechanism 40 is a screw 42 having a conical head 44. With reference in particular to FIG. 3A, the tapered angle A of the frusto-conical recess with respect to the axis of the recess is preferably about 11 degrees. The tapered angle B of the conical head 44 with respect to the axis of the rotation of the screw 42 is preferably about 30 degrees. The tapered angle of the conical head 44 cooperates with the tapered angle of the recess to enhance the amount of fine control that a system operator has in flexing the cantilevered walls 26, 28 to radially adjust the position of the cutting edge 7 of the insert 5 without undesirable overshooting. Additionally, the threaded shank 46 of the screw 42 is provided with a large number of threads (preferably in the order of 51 threads per inch) for the same purpose. When the frusto-conical slot 27 is tapered at an angle of approximately 11 degrees, and the shank 46 has about 51 threads per inch, a full turn of the screw 42 will flex the cantilevered walls 26, 28 approximately 0.004 of an inch. A slight turn of the screw 42 will flex the cantilevered walls 26, 28 approximately 0.0001 of an inch. The fine pitch of the threads of the shank 46 not only enhances control, but also helps to insure that the screw 42 will not loosen due to the mechanical shock and vibration associated with a boring operation. As further assurance, the threads of the shank 46 may be treated a plastic coating so that the screw 42 remains in exactly the same position despite whatever shock or vibration is generated by the boring bar 1. A hexagonal recess 48 is centrally provided at the end of the conical head 44 of the screw 42 for receiving the end of an adjusting wrench (not shown).

In operation, the system operator installs the inserts 5 onto the bar body 3 of the boring bar 1 via the previously described mounting assemblies 11 by pressing the inserts into engagement against pocket surfaces 15, 17 and tightening the insert clamping screws 22 to a desired torque. All during this step, the screw 42 of the wedge mechanism 40 is completely loosened so that the cantilevered walls 26, 28 are not elastically flexed by the conical head 44 of the screw. The position of the cutting edges 7 of each of the cutting inserts 5 disposed around the periphery of the boring bar 1 is then determined by a positioning gauge (not shown). Such gauges are well known in the art. The cutting edges 7 that are radially inward relative to the outermost of these edges are then carefully adjusted radially outward by the system operator by turning the screw 42 of the wedge mechanism 40 counterclockwise so that the conical head 44 of the screw 42 flexes the cantilevered walls 26, 28. After all of the cutting edges 7 have been brought into precise radial alignment with one another via the screw 42 of the position-adjusting mechanisms 25, the boring bar 1 is then mounted on a rotating spindle (also not shown) via the shank 4 of the boring bar 1.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A position-adjusting mechanism for a boring bar including a bar body having at least one pocket therein adapted to receive a cutting insert, said position-adjusting mechanism comprising:
   a pair of flexible cantilevered walls each defining a wall of the pocket.

2. The position-adjusting mechanism of claim 1, wherein said cantilevered walls include:
   an axial cantilevered wall defining an axial wall of said pocket; and
   a radial cantilevered wall defining a radial wall of said pocket.

3. The position-adjusting mechanism of claim 1, further including a wedge mechanism adapted to engage at least one said cantilevered wall to flex said cantilevered walls.

4. The position-adjusting mechanism of claim 1, further including:
   a frusto-conical recess defined at least in part by one of said cantilevered walls; and
   a screw having a threaded shank adapted to engage the bar body and a conical head adapted to engage said frusto-conical recess.

5. A boring bar comprising:
   a bar body having at least one pocket for receiving a cutting insert; and
   a position-adjusting mechanism including a pair of flexible cantilevered walls each defining a wall of said pocket.

6. The boring bar of claim 5, wherein said cantilevered walls include:
   an axial cantilevered wall defining an axial wall of said pocket; and
   a radial cantilevered wall defining a radial wall of said pocket.

7. The boring bar of claim 5, further including a wedge mechanism adapted to engage at least one said cantilevered wall to flex said cantilevered walls.

8. The boring bar of claim 5, further including:
   a frusto-conical recess defined at least in part by one of said cantilevered walls; and
   a screw having a threaded shank adapted to engage the bar body and a conical head adapted to engage said frusto-conical recess.

9. The boring bar of claim 5, wherein said pocket support surfaces include a radial support surface and an axial support surface for supporting the cutting insert.

10. The boring bar of claim 9, further including a corner relief recess provided between said radial and axial support surfaces for receiving a corner of the insert.

11. The boring bar of claim 5, further including a chip flute at a periphery of said pocket.

12. A method for adjusting insert pockets of a boring bar comprising the steps of:

(a) providing a boring bar having a plurality of pockets each defined by a pair of cantilevered walls adapted to be flexed by a wedge mechanism;

(b) installing a cutting insert into each pocket;

(c) determining the position of the cutting edge of each cutting insert; and (d) adjusting the radially inwardmost insert outward by using the wedge mechanism to flex the cantilevered walls.

13. The method according to claim 12, wherein step (a) further includes the steps of:

(e) pressing the cutting inserts into engagement against supporting surfaces of their respective pockets; and (f) tightening an insert clamping screw for each cutting insert to a desired torque.

14. The method according to claim 13, wherein the step (c) is performed with a positioning gauge.

15. The method according to claim 12, wherein step (d) is repeated until all the cutting edges have been brought into radial alignment with one another.

\* \* \* \* \*